United States Patent
Kuo et al.

[11] Patent Number: 5,534,080
[45] Date of Patent: Jul. 9, 1996

[54] METHOD FOR PRODUCING MN-AL THIN FILMS

[75] Inventors: Po C. Kuo; Jin H. Huang; Shang C. Chen, all of Taipei, Taiwan

[73] Assignee: National Science Council of Republic of China, Taipei, Taiwan

[21] Appl. No.: 456,794

[22] Filed: Jun. 1, 1995

[51] Int. Cl.$^6$ ........................................... H01F 1/00
[52] U.S. Cl. .................... 148/121; 148/101; 204/142.2
[58] Field of Search .................................. 148/101, 102, 148/121; 204/192.2

[56] References Cited

U.S. PATENT DOCUMENTS 4,342,608  8/1982  Willens .................................. 148/101
4,533,603  8/1985  Fukuda et al. ....................... 204/192.2

FOREIGN PATENT DOCUMENTS 59-64759  4/1984  Japan ..................................... 148/101
63-76866  4/1988  Japan ................................... 204/142.2

*Primary Examiner*—John Sheehan
*Attorney, Agent, or Firm*—Bacon & Thomas

[57] ABSTRACT

A method of producing a Mn-Al thin film with excellent magnetic properties for magnetic recording medium use. The method includes magnetron sputtering to form a selective composition of Mn-Al ε-phase thin film on a low temperature substrate, then applying a heat treatment under the controlled conditions for a desirable temperature and time period, thereby to transform the ε-phase film to a τ-phase film with high value of saturation magnetization and coercivity.

14 Claims, 4 Drawing Sheets

METHOD FOR PRODUCING MN-AL THIN FILMS

BACKGROUND OF THE INVENTION

1. Field of the Invention

The invention relates to a method for producing a magnetic recording medium by means of magnetron sputtering and more particularly relates to a method for producing a Mn-Al τ-phase thin film.

2. Description of the Prior Art

Recently, the amount of information storage is increased rapidly due to the rapid development of the computer industry. In order to get high recording density, the magnetic recording media have been improved from the conventional γ-$Fe_2O_3$ particles system to the thin film media.

A high recording density thin film medium needs high coercity force, high saturation magnetization, high stability and high wear resistance.

In the present thin film recording media, the CoCrM (M=Ni, Pt, Ta) thin films are the most widely used materials due to its high coercivity Hc (1500–1800 Oe) and high saturation magnetization Ms (600–1200 emu/cc). However, these metal thin films still have some drawbacks such as the high cost of the raw materials, low coercivity, the corrosion problem, the low hardness and the complicated fabrication process.

In order to overcome these problems many investigatiors studies the oxide films. Although the oxide films have better characteristics about the deficiencies of the CoCrM films described above, the magnetic properties of the oxide films are poorer than the metal films. For example, the saturation magnetization and coercivity of the γ-$Fe_2O_3$ film are about 300 emu/cc and 300 Oe, respectively. The coercivity of γ-$Fe_2O_3$ may be increased by doping Co element, but the thermal stability is decreased due to that the considerable variation of the crystal anisotropy constant of the Co-γ-$Fe_2O_3$ with temperature.

Since the present magnetic recording media have to improve further to cope with the ever-increasing demand of recording density, many investigators try to find some novel recording materials; among them, Mn-Al thin films are examplary. The Mn-Al τ-phase is a promising material for magnetic recording media because it has a high magnetic anisotry constant, high hardness and high stability. In addition, it comprises of low-cost materials instead of scarce materials such as Co, Ni, Ta and Pt. And the magnetic recording media for the MR magnetic head which will be used in future needs a high Hc value above 2500 Oe. The Mn-Al thin film produced in this invention has high Hc value up to about 3000 Oe. Therefore, this Mn-Al thin film may become the high density recording media in the future.

According to the literature (A. Morisako and M. Matsumoto, "Synthsis of the ferromagnetic τ-phase of Mn-Al film by sputtering", J.Appl. Phys. vol. 61, no. 8, p 4281, 1987), ferromagnetic τ-phase of Mn-Al thin films were synthesized at Mn constant of about 60 at. % and substrate temperature of about 150° C. However, these films exhibited low saturation magnetization which is 120 emu/cc. It is only one-fourth of the bulk material. Obviously, their Mn-Al films are not pure τ-phase. Further investigations (M. Matsumoto, A. Morisaka, and J. Oshima, "Properties of ferromagnetic Mn-Al thin films with additives", J. Appl. Phys., vol. 69, no. 8, p. 5172, 1991) were studied by doping the elements such as Cu, Ni, Fe, Co, Ag, Zn; they found a maximum saturation magnetization of about 300 emu/cc for a $Mn_{38}$-$Al_{40}$-$Cu_{22}$ thin film, however its coercivity decrease to about 220 Oe. These films were composed of both the Mn-Al τ-phase and Mn-Al-Cu κ-phase. The two methods described above did not produced the pure τ-phase successful. So, the magnetic properties of their films are not good. The single ferromagnetic Mn-Al τ-phase has not been fabricated before.

SUMMARY OF THE INVENTION

The object of the present invention is to provide a method of making a magnetic recording medium with excellent magnetic properties by means of magnetron sputtering. Another object of this invention is to fabricate a single and homogeneous Mn-Al τ-phase thin film which has not been possible obtained by prior art. The coercivity of the τ-phase produced in this invention can up to 3200 Oe, and the saturation magnetization can be attained to about 500 emu/cc. A well crystallized Mn-Al ε-phase was preliminary prepared by sputtering a Mn-Al alloy target or a composite target comprised of a Al disk and the Mn sheets, then it was undergone an optimum heat treatment to obtain the magnetic τ-phase.

DETAILED DESCRIPTION AND EMBODIMENT OF THE INVENTION

Mn-Al thin films of this invention are prepared by conventional magnetron sputtering system with a DC or RF power supply. Two types of targets were used in this invention; one is a composite target consisting of an Al disk overlaid with small manganese pieces. This arrangement provides a wide range of effective target compositions and therefore films compositions, the other one is an alloy target which was prepared by using a high-frequency induction furnace under a protective argon atmosphere. Alloy constituents may be obtained from commercial grade raw materials which typically are at least 99.5 percent pure for Al and at least 98 percent pure for Mn. Typical impurities in manganese piece are Ca, Cr, Co, Fe, Mg, Ni, P and C; aluminum plate typically comprises some of Cu, Fe, Mg, Na, Si, Ti, V and Zn. The alloy composition is preferably in the range of 45 to 58 atomic percent Mn. For optimized magnetic properties a more narrow range of 48 to 51 atomic percent Mn is preferred. The cast ingot was then machined into disk shape with a thickness about 2–3 mm. The conventional magnetron sputtering system was used to prepare the Mn-Al thin films. The base pressure in the system was $10^{-6}$ Torr or lower, and after the high purity Ar gas was intorduced, the sputtering pressure $P_{Ar}$ was set at 0.3–5 mTorr. The $P_{Ar}$ influence the deposition rate greatly; for the high deposition rate the $P_{Ar}$ of 0.5–1.5 mTorr is preferred and a deposition rate as high as 6–8 Å/sec can be obtained at an input rf power density of 4 W/cm².

A glass plate of 0.5 mm thick was used as substrate. The sputtering was proceeded at room temperature, and the substrate temperature is maintained at 30° C. during the sputtering process. However, if the substrate was heated above 80° C. by a heating element the magnetic properties of the film will decrease rapidly. This is due to the formation of equilibrium β and γ-phase which are nonmagnetic.

Figure 1:
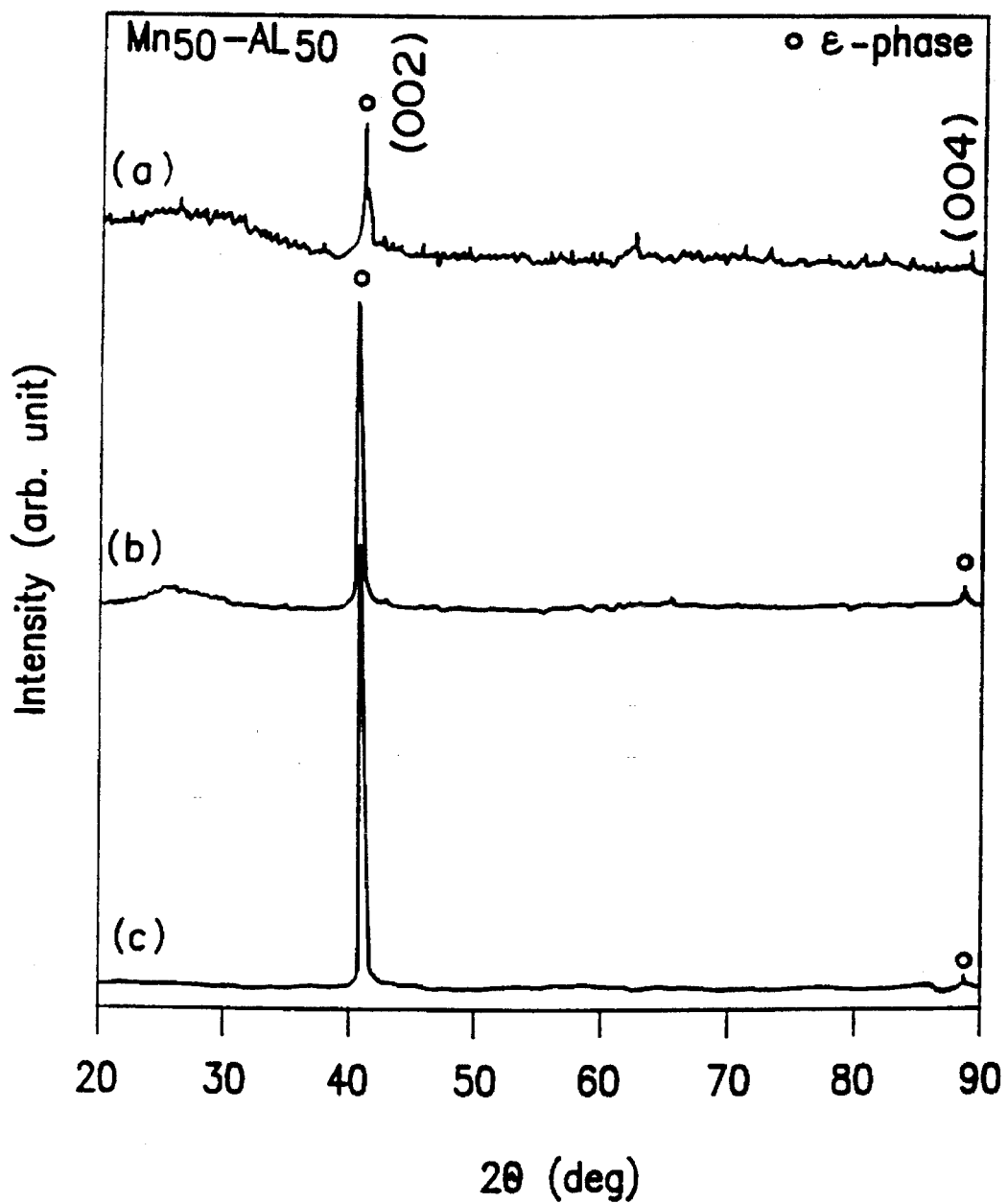
FIG. 1 is the X-ray diffration patterns of the $Mn_{50}$-$Al_{50}$ films with substrate temperature: (a) 200° C.; (b) 100° C.; (C) 30° C. The phase appeared is the ε-phase.
Figure 2:
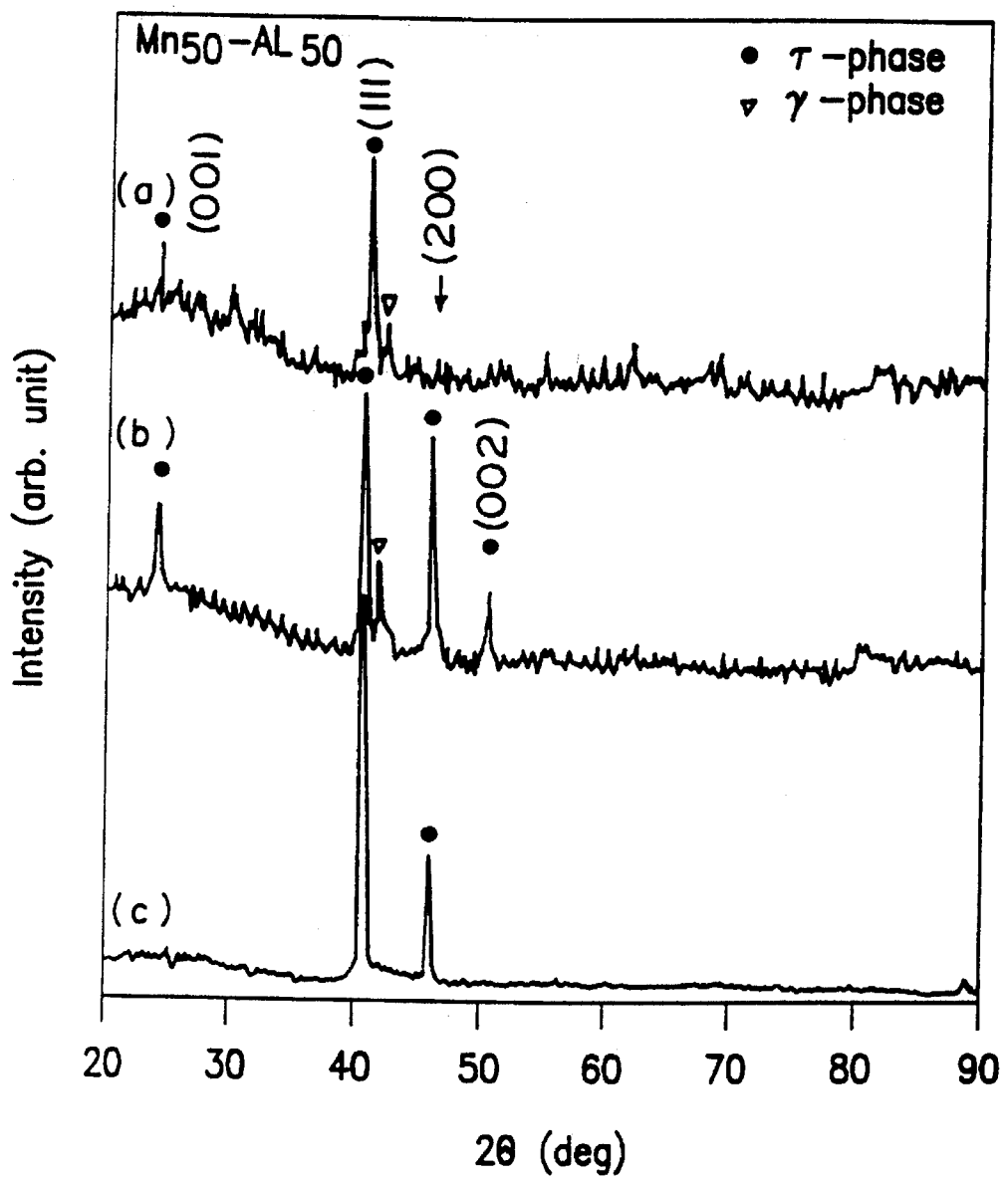
FIG. 2 is the X-ray diffration patterns of the corresponding samples in FIG. 1 after annealing at 410° C. for 30 min. The phase appeared is the pure τ-phase when the film was deposited on the substrate at 30° C., as shown in FIG. 2 (C).

X-ray diffration analysis indicated that the as-deposited films were ε-phases, as shown in FIG. 1. These films will be transformed to magnetic τ-phases when they are annealed at temperature between 400° to 470° for 30 min. The X-ray diffration patterns of the annealed samples are shown in FIG. 2, which indicates that the single τ-phase can be obtained when the film is deposited at low temperature. The Mn-Al films produced in this invention have excellent magnetic properties at the film thickness between 0.1 μm and 1 μm, preferably between 0.4 μm and 0.8 μm; their coercivity were about 2800–3200 Oe, and the saturation magnetization were about 400–500 emu/cc.

In the prior arts, the Mn-Al thin film prepared by A. Morisako et al. contained large amount of ε, κ and γ phases instead of single γ-phase. Their magnetic properties are not good. The differences between this invention and prior arts can be summarized as follows:

(1) The pure Mn-Al τ-phase thin film in this invention was formed by the phase transformation reaction i.e. a well crystallized ε-phase film was formed preliminary, then it was transferred to pure τ-phase after an annealing treatment. (In the prior arts, the Mn-Al multiphase thin film which included τ-phase was grown on the substrate directly in the sputtering process.)

(2) In order to obtain high magnetic properties the composition of the Mn-Al thin film must be close to $Mn_{50}$-$Al_{50}$ (In the prior arts, the composition of their films are $Mn_{60}$-$Al_{40}$). When the content of Mn beyond 50 wt %, the excess of Mn atoms will form antiferromagnetic coupling and leads to the decrease of Ms.

(3) In this invention, the optimum substrate temperature during deposition is near 25° C., in order to get well crystallized ε-phase. For the prior arts, the substrate temperature was 150° C. or above. So their as-deposited phase was not ε-phase. Since the ε-phase is a high temperature quenched phase, low substrate temperature can induce the formation of the well crystallized ε-phase.

More examples and experiment results of the invention will be set forth below to affirm above conclusion.

EXAMPLE 1

The Mn-Al alloy of various composition was used as target and sputtered in an Ar gas atmosphere on the glass substrate. The initial substrate temperature was at room temperature (30° C). The substrate rotates at a speed of 10 rpm. After the sputtering chamber was evacuated to $10^6$ Torr, Ar gas was introduced into the chamber. The Ar pressure was maintained at about 1 mTorr during the entire sputtering period. The deposition rate was 6 Å/sec at an applied rf power of 4 W/cm². The as-deposited films were annealed at 410° C. for 30 min in vacuum. The magnetic properties of the various resulting magnetic films measured by V.S.M at an applied field of 20 kOe are shown in Table 1 as follow:

TABLE 1

| | composition | thickness | Hc (Oe) | Ms (emu/cc) |
|---|---|---|---|---|
| sample 1 | $Mn_{45}$—$Al_{55}$ | 0.8 μm | 1500 | 148 |
| sample 2 | $Mn_{48}$—$Al_{52}$ | 0.8 μm | 2500 | 350 |
| sample 3 | $Mn_{50}$—$Al_{50}$ | 0.8 μm | 3200 | 500 |
| sample 4 | $Mn_{52}$—$Al_{48}$ | 0.8 μm | 2600 | 410 |
| sample 5 | $Mn_{53}$—$Al_{47}$ | 0.8 μm | 1000 | 200 |
| sample 6 | $Mn_{60}$—$Al_{40}$ | 0.8 μm | 0 | 0 |
| sample 7 | $Mn_{55}$—$Al_{45}$ | 0.8 μm | 600 | 120 |
| sample 8 | $Mn_{50}$—$Al_{50}$ | 0.03 μm | 300 | 80 |
| sample 9 | $Mn_{50}$—$Al_{50}$ | 0.12 μm | 2200 | 400 |
| sample 10 | $Mn_{50}$—$Al_{50}$ | 0.4 μm | 2000 | 460 |
| sample 11 | $Mn_{50}$—$Al_{50}$ | 1.02 μm | 3000 | 500 |
| sample 12 | $Mn_{50}$—$Al_{50}$ | 1.5 μm | 2600 | 500 |

EXAMPLE 2

Figure 3:
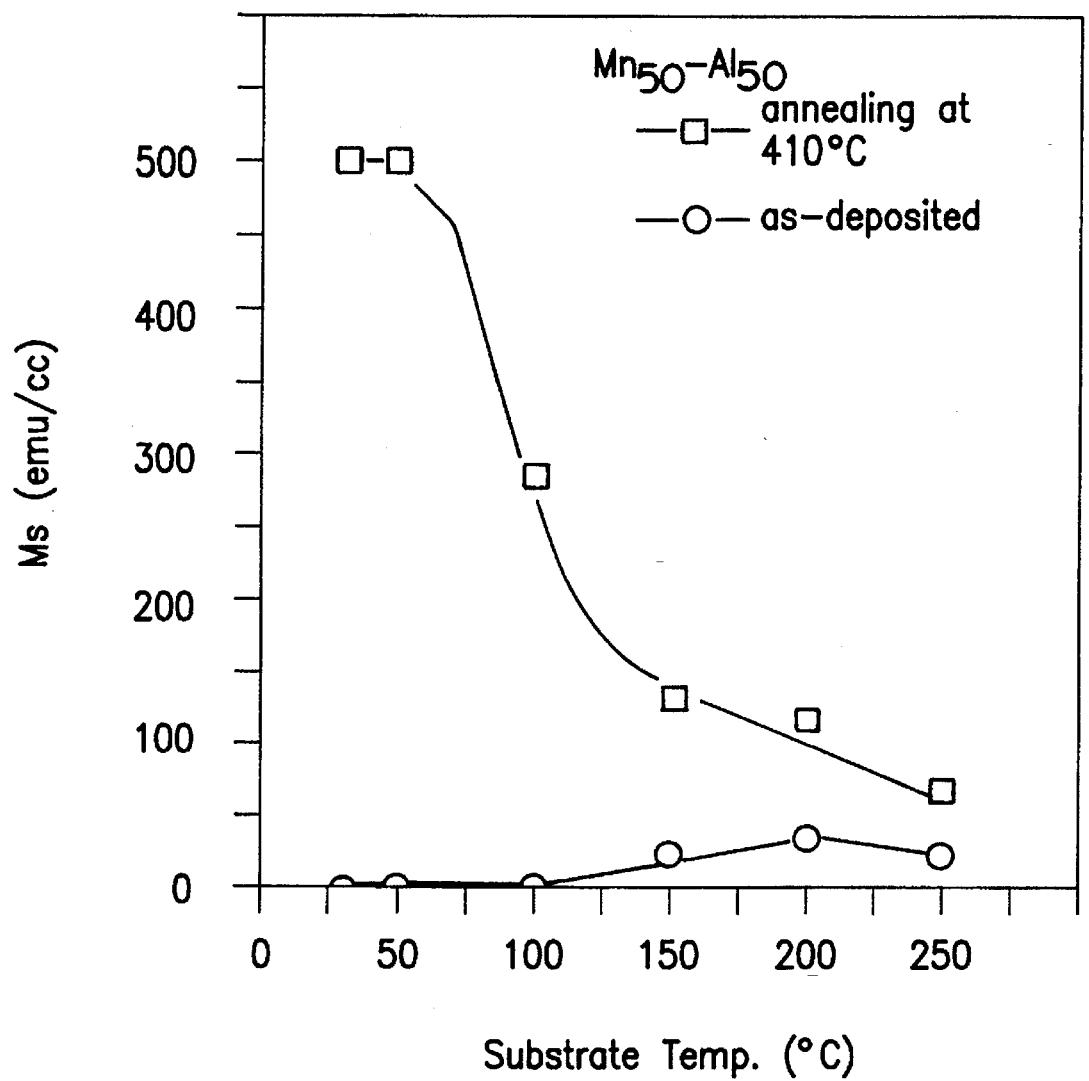
FIG. 3 is a diagram illustrating saturation magnetization Ms of $Mn_{50}$-$Al_{50}$ films as a function of substrate temperature. The annealing time is 30 min.

The Mn-Al alloy with a composition of 50 atomic percent Mn was used as a target and the sputtering condition was the same as example 1 while the substrate temperature was varied from 50° C. to 250° C. before sputtering. The substrate temperature was kept at constant during the entire sputtering period. After deposition, the films were annealed at 410° C. for 30 min., the magnetic properties of the resulting film were shown in FIG. 3.

EXAMPLE 3

Figure 4:
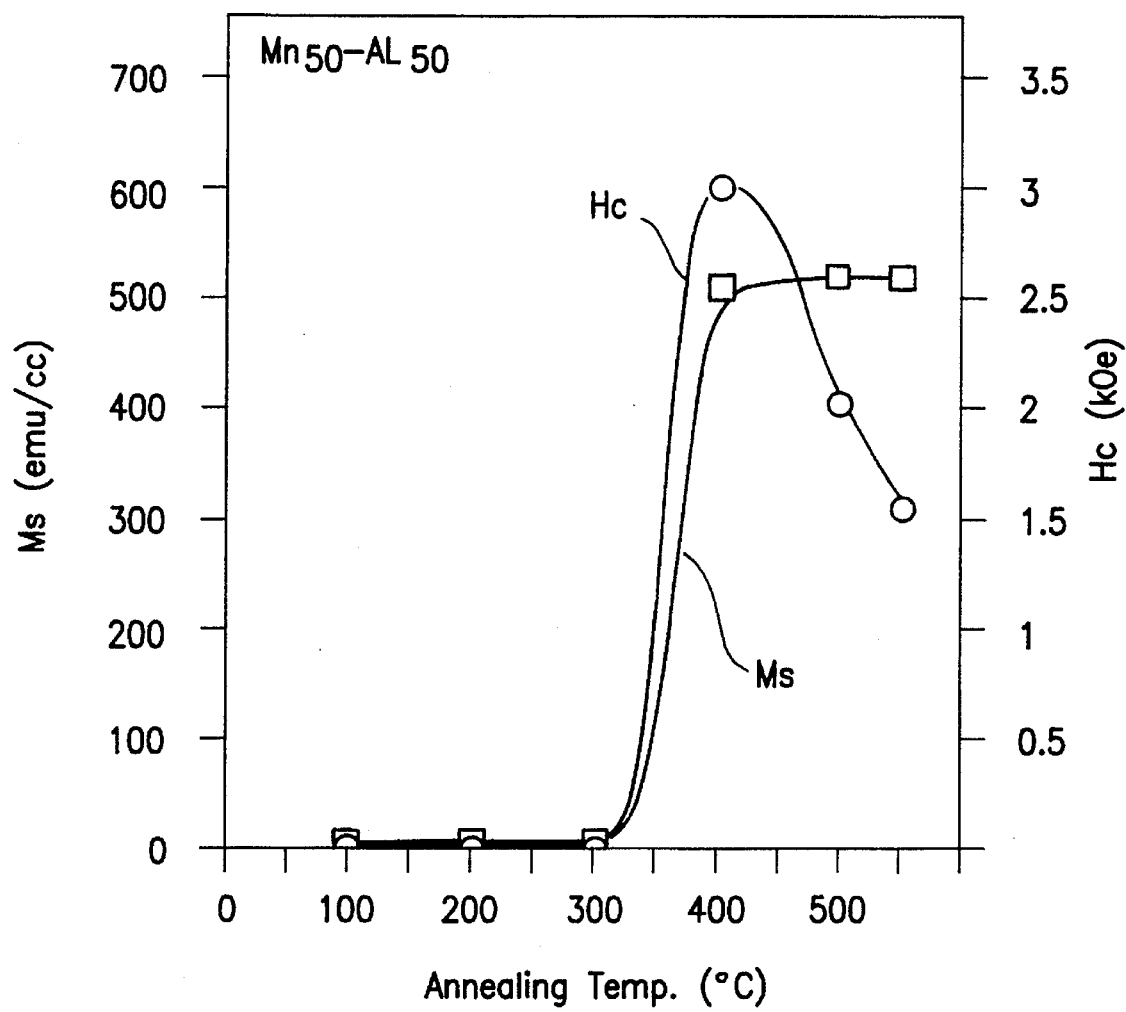
FIG. 4 is a diagram illustrating the magnetic properties of $Mn_{50}$-$Al_{50}$ films as a function of annealing temperature. The annealing time is 30 min.

The Mn-Al alloy with a composition of 50 atomic percent Mn was used as a target and the sputtering condition was the same as example 1. The substrate temperature was 30° C. The as-deposited films were annealed at various temperature between 410° C. and 550° C. for 30 min. The magnetic properties of the resulting films were shown in FIG. 4.

We claim:

1. A method for producing a magnetic recording medium comprising the steps of: forming an ε-phase Mn-Al film by magnetron sputtering; and applying a heat treatment on the ε-phase Mn-Al film to transform the film to a τ-phase Mn-Al film having magnetic properties of Ms>300 emu/cc and Hc>600 Oe.

2. The method of claim 1, wherein the heat treatment occurs at a temperature between 400 and 500 degrees Celsius.

3. The method of claim 2, wherein the heat treatment occurs at a temperature between 400 and 470 degrees Celsius.

4. The method of claim 1, wherein the atomic ratio of Mn:Al is in the range of 45:55 to 58:42.

5. The method of claim 4, wherein the atomic ratio of Mn:Al is in the range of 48:52 to 51:49.

6. The method of claim 5, wherein the atomic ratio of Mn:Al is about 50:50.

7. The method of claim 1, wherein the power supply for the magnetron sputtering is selected from the group consisting of DC and RF.

8. The method of claim 1, wherein the magnetron sputtering occurs using a target selected from the group consisting of an Mn-Al alloy and a composite target of an Al disk overlaid with manganese pieces.

9. The method of claim 1, wherein the ε-phase Mn-Al film is sputtered onto a glass substrate.

10. The method of claim 1, wherein the ε-phase Mn-Al film is sputtered onto a substrate that is at a temperature of less than about 80 degrees Celsius.

11. The method of claim 10, wherein the substrate temperature is about 30 degrees Celsius.

12. The method of claim 10, wherein the substrate temperature is about 25 degrees Celsius.

13. The method of claim 1, wherein sputtering occurs at a pressure of 0.3–5 mTorr.

14. The method of claim 13, wherein sputtering occurs at a pressure of 0.5–1.5 mTorr.

* * * * *